United States Patent
Bendlin et al.

(10) Patent No.: US 10,638,337 B2
(45) Date of Patent: *Apr. 28, 2020

(54) MULTI-STAGE SEGMENTED DOWNLINK CONTROL INFORMATION WITH REDUCED OVERHEAD

(71) Applicant: AT&T INTELLECTUAL PROPERTY I, L.P., Atlanta, GA (US)

(72) Inventors: Ralf Bendlin, Cedar Park, TX (US); Xiaoyi Wang, Austin, TX (US); SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,496

(22) Filed: Mar. 15, 2019

(65) Prior Publication Data
US 2019/0215705 A1   Jul. 11, 2019

Related U.S. Application Data

(63) Continuation of application No. 15/587,155, filed on May 4, 2017, now Pat. No. 10,278,168.

(51) Int. Cl.
*H04W 72/04* (2009.01)
*H04W 24/02* (2009.01)
(Continued)

(52) U.S. Cl.
CPC ........... *H04W 24/02* (2013.01); *H04L 5/0053* (2013.01); *H04W 28/065* (2013.01);
(Continued)

(58) Field of Classification Search
CPC ............... H04W 72/042; H04W 24/02; H04W 72/0453; H04W 72/0446; H04Q 2213/0446
See application file for complete search history.

(56) References Cited

U.S. PATENT DOCUMENTS 8,995,368 B2   3/2015   Moon et al.
9,113,458 B2   8/2015   Lee et al.
(Continued)

FOREIGN PATENT DOCUMENTS

EP      2 737 767 A1   6/2014
JP      2015-144458 A  8/2015
(Continued)

OTHER PUBLICATIONS

NPL-1 Webpage, 3GPP Rel 8 DCI Format 0 and 1, Dec. 2009 (Year: 2009).*

(Continued)

*Primary Examiner* — Dong-Chang Shiue
(74) *Attorney, Agent, or Firm* — Amin, Turocy & Watson, LLP

(57) ABSTRACT

Various embodiments disclosed herein provide for multi-stage segmentation of downlink control information. Downlink control information can arrive at a user equipment on more than one channel, setting up and configuring data channels for different base stations, or data channels for the same base station but where the data channels are in different frequency domains or time domains. The downlink control information segmentation system disclosed herein can determine when downlink control information for the user equipment is common across a plurality of downlink control channels, and ensure that the downlink control information is sent just one time, to avoid redundant data transmissions and increased overhead.

20 Claims, 10 Drawing Sheets

(51) Int. Cl.
*H04L 5/00* (2006.01)
*H04W 28/06* (2009.01)
*H04W 72/12* (2009.01)

(52) U.S. Cl.
CPC ..... *H04W 72/042* (2013.01); *H04Q 2213/13215* (2013.01); *H04W 72/0446* (2013.01); *H04W 72/0453* (2013.01); *H04W 72/1289* (2013.01)

(56) References Cited

U.S. PATENT DOCUMENTS

| | | | |
|---|---|---|---|
| 9,363,808 B2 | 6/2016 | Kim et al. | |
| 9,369,254 B2 | 6/2016 | Seo et al. | |
| 9,461,785 B2 | 10/2016 | Park et al. | |
| 9,549,396 B2 | 1/2017 | Lee et al. | |
| 2011/0183673 A1* | 7/2011 | Kishiyama | H04B 7/022 |
| | | | 455/436 |
| 2012/0281646 A1 | 11/2012 | Liao et al. | |
| 2013/0242882 A1* | 9/2013 | Blankenship | H04W 72/042 |
| | | | 370/329 |
| 2013/0250879 A1 | 9/2013 | Ng et al. | |
| 2014/0293946 A1 | 10/2014 | Suzuki et al. | |
| 2015/0016370 A1 | 1/2015 | Takeda et al. | |
| 2016/0128028 A1* | 5/2016 | Mallik | H04W 72/042 |
| | | | 370/336 |
| 2017/0048886 A1 | 2/2017 | Sun et al. | |
| 2017/0086220 A1 | 3/2017 | Kim et al. | |

FOREIGN PATENT DOCUMENTS

| | | |
|---|---|---|
| WO | 2013/022267 A2 | 2/2013 |
| WO | 2013/174167 A1 | 11/2013 |
| WO | 2014/186971 A1 | 11/2014 |
| WO | 2015/006919 A1 | 1/2015 |
| WO | 2016/115667 A1 | 7/2016 |

OTHER PUBLICATIONS

Balint et al., "Scheduling Techniques Evaluation in LTE systems with Mixed Data Traffic", Electronics and Telecommunications (ISETC), 9th International Symposium on IEEE, 2010, pp. 221-224.

Non-Final Office Action received for U.S. Appl. No. 15/587,155 dated Jul. 6, 2018, 36 pages.

* cited by examiner

MULTI-STAGE SEGMENTED DOWNLINK CONTROL INFORMATION WITH REDUCED OVERHEAD

RELATED APPLICATION

The subject patent application is a continuation of, and claims priority to, U.S. patent application Ser. No. 15/587,155, filed May 4, 2017, and entitled "MULTI-STAGE SEGMENTED DOWNLINK CONTROL INFORMATION WITH REDUCED OVERHEAD," the entirety of which application is hereby incorporated by reference herein.

TECHNICAL FIELD

The present application relates generally to the field of mobile communication and, more specifically, to reducing overhead associated with transmitting downlink control information by avoiding retransmitting common downlink control information in a next generation wireless communications network.

BACKGROUND

To meet the huge demand for data centric applications, Third Generation Partnership Project (3GPP) systems and other systems that employ one or more aspects of the specifications of a Fourth Generation (4G) standard for wireless communications will be extended to Fifth Generation (5G) standards for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
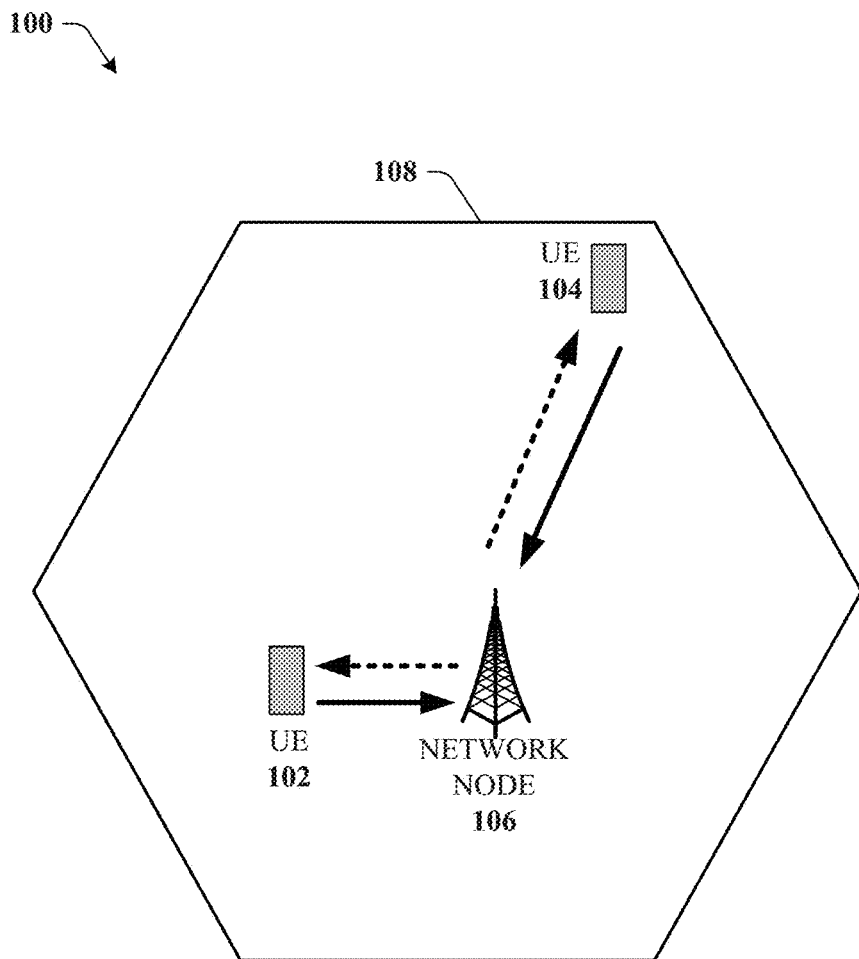
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for multi-stage segmentation of downlink control information. Downlink control information can arrive at a user equipment on more than one channel, setting up and configuring data channels for different base stations, or data channels for the same base station but where the data channels are in different frequency domains or time domains. The downlink control information segmentation system disclosed herein can determine when downlink control information for the user equipment is common across a plurality of downlink control channels, and ensure that the downlink control information is sent just one time, to avoid redundant data transmissions and increased overhead.

In various embodiments, a base station device can comprise a processor and a memory that stores executable instructions that, when executed by the processor facilitate performance of operations. The operations can comprise determining that first downlink control information for a first downlink control channel and second downlink control information for a second downlink control channel comprise redundant downlink control information. The operations can also comprise transmitting the redundant downlink control information to a mobile device via the first downlink control channel and not the second downlink control channel.

In another embodiment, method comprises determining, by a first base station device comprising a processor, that first downlink control information for a first downlink control channel and second downlink control information for a second downlink control channel comprise third downlink control information in common, wherein the first downlink control information is associated with managing a first communication link between the first base station device and a mobile device, and the second downlink control information is associated with managing a second communication link between a second base station device and the mobile device. The method can also comprise transmitting, by the first base station device, the third downlink control information for the second communication link to the mobile device via the first downlink control channel.

In another embodiment machine-readable storage medium, comprising executable instructions that, when executed by a processor of a device, facilitate performance of operations. The operations can comprise determining that first downlink control information for a first downlink control channel and second downlink control information for a second downlink control channel comprise shared downlink control information, wherein the first downlink control channel and the second downlink control channel are associated with a first data channel on a first frequency band and a second data channel on a second frequency band. The operations can also comprise transmitting the shared downlink control information to a mobile device on the first downlink control channel and not the second downlink control channel.

In an embodiment, the common downlink control information (DCI) can be slowly varying DCI or UE-specific and quickly varying DCI. The common or slowly varying DCI is thereby transmitted less frequently where the frequency of the transmission may be in time, space or frequency domain (the latter being measured in Hertz). For example, if a UE receives two physical downlink control channel (PDCCH) for a physical downlink shared channel (PDSCH) from two transmission/reception points (TRPs) as often the case in coordinated multi-point (CoMP) deployments where a group of base stations communicate with a mobile device near a cell edge to boost performance, the common DCI of both PDCCHs is only transmitted ones (spatial domain). Similarly, if a UE is assigned several PDSCH transmissions in several subbands of a frequency spectrum, the common DCI of all PDSCHs is only transmitted ones (frequency domain). Lastly, if a UE is assigned several subsequent transmissions in the same or consecutive slots/subframes, the common DCI of all PDSCHs is only transmitted ones (time domain). Further examples will be given in the detailed disclosure and even more examples can be conceived by someone skilled in the art.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," gNodeB (gNB), "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

It is also to be appreciated that while the embodiments described herein have been described in relation to codeblock segmentation configuration from the network node/base station to the UE, the same principles can also be applied to uplink codeblock segmentation and side link systems. Similarly, note that for simplicity we use the radio network node or simply network node is used for gNB. It refers to any type of network node that serves UE and/or connected to other network node or network element or any radio node from where UE receives signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Likewise, for reception we use the term mobile device and user equipment (UE) interchangeably to refer to the same type of device. It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure.

Figure 2:
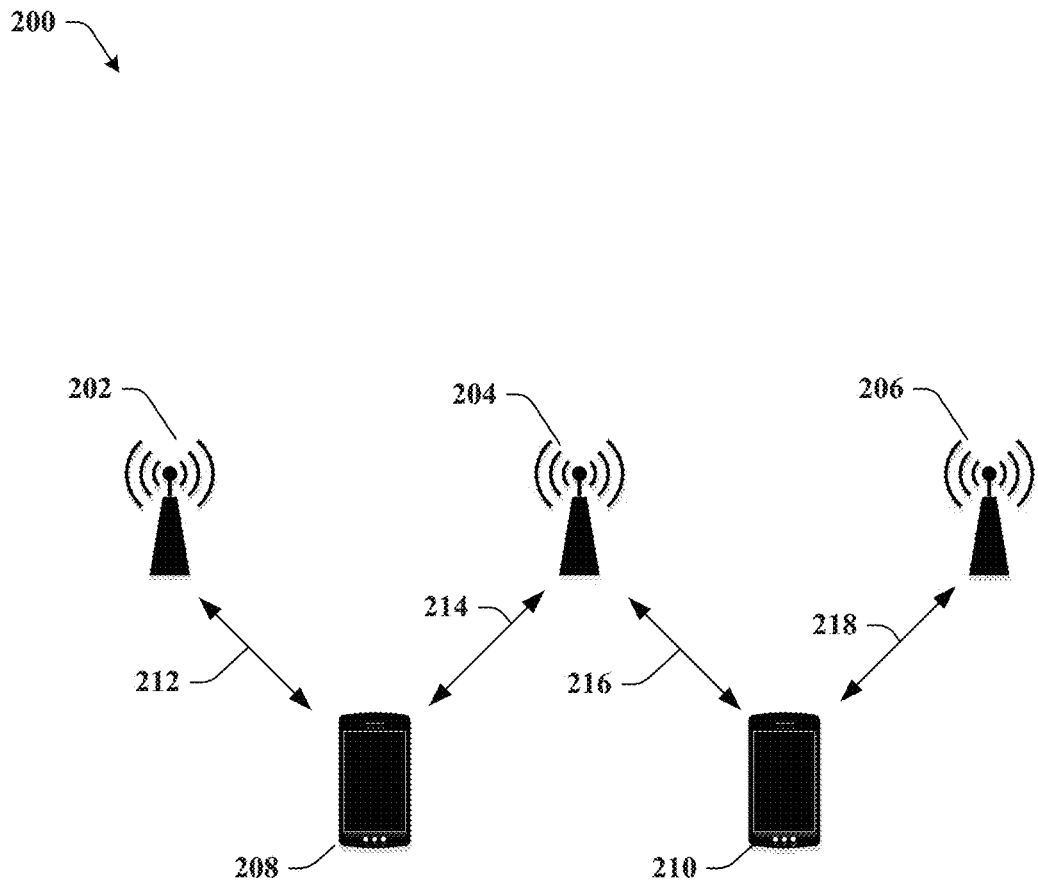
FIG. 2 illustrates an example block diagram of a group of base stations in communication with a group of mobile devices in accordance with various aspects and embodiments of the subject disclosure.

Turning now to FIG. 2, illustrated is an example block diagram 200 of a group of base stations in communication with a group of mobile devices in accordance with various aspects and embodiments of the subject disclosure.

Base station devices 202, 204, and 206 can have respective communications links with mobile devices 208 and 210, with base station device 202 having a link 212 with mobile device 208, base station device 204 having links 214 and 216 with devices 208, and 210, and base station device 206 having a communication link 218 with mobile device 210. Almost all transmissions in both the downlink and uplink are scheduled by the PDCCH, i.e., a downlink (DL) transaction comprises a DL assignment carried in the DCI, an associated data transmission carried on the PDSCH, and an associated hybrid automatic repeat request (HARQ) (negative) acknowledgement (NACK/ACK) transmitted on either the physical uplink shared channel (PUSCH) or the physical uplink control channel (PUCCH). Similarly, an UL transaction comprises an UL grant carried in the DCI and a subsequent data transmission on the PUSCH. The information carried in the DCI generally differs for DL assignments and UL grants.

For example, a DL assignment may contain:
A carrier indicator for multi-carrier deployments
A resource allocation header indicating to the UE the resources for the associated PDSCH transmission
Transmit power control information for the associated PUCCH transmission carrying the HARQ ACK/NACK feedback
Downlink assignment information for time-division duplexed systems
A HARQ process number for asynchronous HARQ operation
Antenna port information for demodulation of the associated PDSCH
A request for a sounding reference signal (SRS) transmission
Information indicating the modulation and coding scheme (MCS) and redundancy version (RV) of the associated PDSCH, possibly per code word (CW)
A new data indicator (NDI), possibly per code word (CW)
A PDSCH RE Mapping and Quasi-Co-Location Indicator (PQI) for coordinated multi-point (CoMP) transmissions
Similarly, an UL grant may contain in the DCI:
A carrier indicator for multi-carrier deployments
A resource allocation header indicating to the UE the resources for the associated PUSCH transmission
Transmit power control information for the associated PUSCH
Antenna port and reference signal information for transmission of the associated PUSCH
Downlink assignment information for time-division duplexed systems
A request for a sounding reference signal (SRS) transmission
A request for a channel state information reference signal (CSI-RS) transmission
Information indicating the modulation and coding scheme (MCS) of the associated PUSCH, possibly per code word (CW)
A new data indicator (NDI), possibly per code word (CW)

In an embodiment, a UE 208 can be connected to both base station device 202 and base station device 204 via communications links 212 and 214 respectively. The UE 208 can receive PDSCH (downlink data) transmissions from either base station device 202 and base station device 204 simultaneously, however, this shall not be construed in a limiting sense. Similarly, the UE 208 can transmit PUSCH (uplink data) transmissions over communication links 212 and 214 which may be intended for either base station device 202 or 204 respectively. In traditional systems, the associated PDCCHs for each PUSCH/PDSCH transmission is self-contained, i.e., each group of downlink information (DCI) contains all the information necessary to transmit/receive a PUSCH/PDSCH. As previously discussed, some of this information may be redundant, i.e., several fields of the DCI will have identical values for the associated PUSCH/PDSCH transmissions Therefore, in an embodiment, UE 208 can receive downlink control information from base station device 202 via link 212 and from base station device 204 via link 214, respectively. The DCI from base station device 202 carried on the PDCCH transmitted on link 212 may contain all the information to transmit a PDSCH or PUSCH on link 212 whereas the DCI from base station device 204 may only contain incremental information to transmit a PDSCH or PUSCH on link 214 that is not readily known to the UE 208 from the first PDCCH transmitted on link 212. For example, both the transmissions on link 212 and 214 may use the same MCS and hence this information is not included in the second DCI transmitted on link 214. Other combinations and examples are similar in nature.

In another embodiment one base station device 204 could send DCI common to both UEs 208 and 210 on links 214 and 216 whereas additional DCI not common to both UEs is transmitted by base station device 202 to UE 208 and base station device 206 to UE 210 on links 212 and 218 respectively. In other embodiments, other combinations and configurations are possible.

Turning now to FIG. 3, illustrated are example block diagrams 300 showing a set of downlink control segmentations in accordance with various aspects and embodiments of the subject disclosure.

Figure 3A:
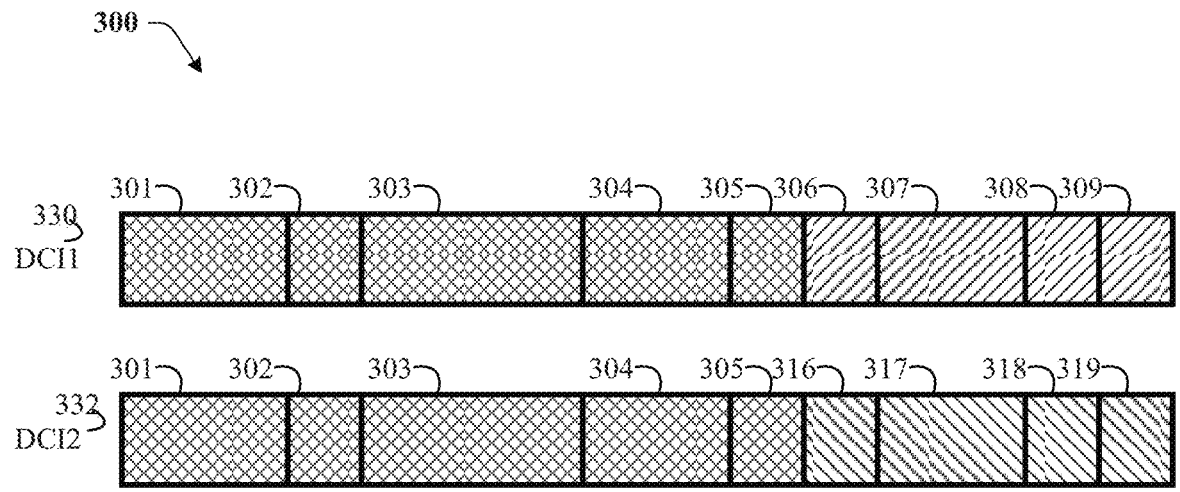
FIGS. 3A, 3B, and 3C illustrate example block diagrams showing a set of downlink control segmentations in accordance with various aspects and embodiments of the subject disclosure.

In FIG. 3A, a legacy approach to transmitting downlink control information is shown where a first set of DCI 330 comprises DCI blocks 301, 302, 303, 304, 305, 306, 307, 308, and 309. DCI1 could be for example, the DCI sent by base station device 202 to UE 208. DCI2 332, which could be the DCI sent by base station device 204 to UE 208 could comprise DCI blocks 301, 302, 303, 304, 305, 316, 317, 318, and 319, with only the last four blocks differing from DCI1 330. In a traditional system, each base station device would send the entire package of DCI blocks even though UE 208 would be receiving the first 5 DCI blocks twice from each base station device.

Figure 3B:
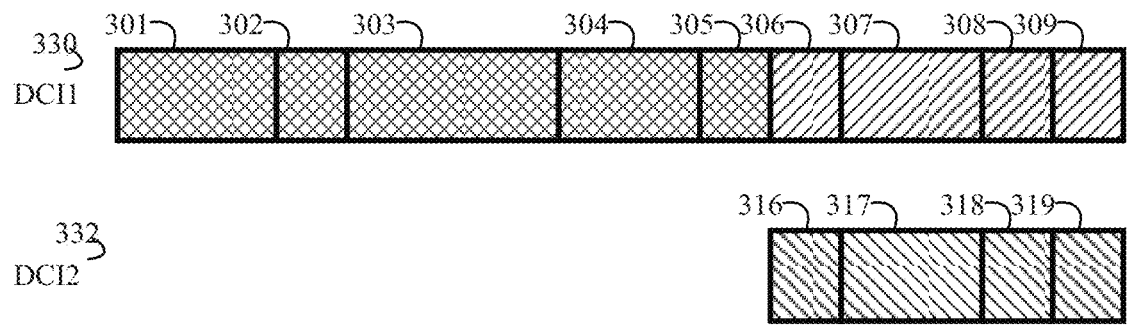

In one of the embodiments of the disclosure, shown in FIG. 3B, the redundant, common, or shared DCI blocks 301, 302, 303, 304, and 305 are only sent once (e.g., in DCH 330) while the other base station device sends DCI2 332 with just DCI blocks 316, 317, 318, and 319.

Figure 3C:
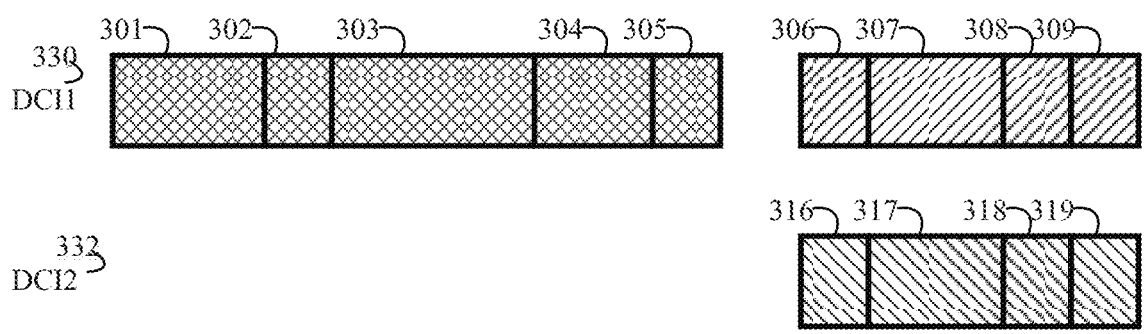

In yet another embodiment, shown in FIG. 3C, DCI is always transmitted in two stages. The common DCI 301, 302, 303, 304, and 305 is transmitted on one PDCCH, and the remaining fields (306, 307, 308, and 309 for one PDSCH/PUSCH and 316, 317, 318, and 319 for another PDSCH/PUSCH) are each transmitted on a separate second and third PDCCH, respectively. For example, a central node 204 depicted in FIG. 2 could transmit slowly-varying and/or common DCI (301, 302, 303, 304 and 305) whereas distributed nodes 202 and 206 could transmit quickly varying or TRP/UE specific DCI (306, 307, 308, and 309 for one PDSCH/PUSCH and 316, 317, 318, and 319 for another PDSCH/PUSCH, respectively). This, for instance, may be beneficial, if the nodes 202, 204, and 206 are connected via a non-ideal backhaul with high or unreliable latency and low bandwidth. Quickly varying DCI is transmitted from each TRP separately whereas slowly varying DCI can be transmitted jointly and the latency and jitter of the backhaul connecting the edge nodes determines what is slowly and quickly varying information.

In an embodiment, the second and third PDCCH comprising fields 306, 307, 308, and 309 for one PDSCH/PUSCH and 316, 317, 318, and 319 for another PDSCH/PUSCH, respectively have cyclic redundancy bits attached whereas the first PDCCH comprising fields 301, 302, 303, 304, and 305 can have no CRC attached. In this example, the CRC of the second PDCCH uses the payload of the fields 301, 302, 303, 304, 305, 306, 307, 308, and 309 to compute the CRC whereas the third PDCCH uses the payload of the fields 301, 302, 303, 304, 305, 316, 317, 318, and 319 to compute the CRC. By not transmitting a CRC with the first PDCCH, overhead can be reduced thereby increasing the spectral efficiency and/or coverage of the system. At the same time, by calculating the CRC across all DCI (fields 301, 302, 303, 304, 305, 306, 307, 308, and 309 and fields 301, 302, 303, 304, 305, 316, 317, 318, and 319, respectively) it is guaranteed that the receiver must detect all fields correctly even when sent in separate transmissions.

In yet another embodiment, the second and third PDCCH comprising fields 306, 307, 308, and 309 for one PDSCH/PUSCH and 316, 317, 318, and 319 for another PDSCH/PUSCH, can respectively have a long CRC attached whereas the first PDCCH comprising fields 301, 302, 303, 304, and 305 can have a short CRC attached. The short CRC is calculated using the payload of fields 301, 302, 303, 304, and 305 whereas the long CRC is calculated using the payload of fields 301, 302, 303, 304, and 305 and 316, 317, 318, and 319, respectively.

In any of the embodiments herein, the CRC may be scrambled by a bit sequence known to the receiver, e.g., through system information broadcast, specification, or UE-specific radio resource control (RRC) signaling. When the receiver decodes a PDCCH, said scrambling can be used to determine whether the payload, namely, the DCI was intended for a given receiver. Alternatively, assuming the payload (viz. DCI) is encoded using polar codes, the frozen bits location of the polar encoder may be used to determine whether the DCI was intended for a given receiver. In particular, for the common DCI 301, 302, 303, 304, and 305 the network can configure, for instance through system information broadcast, specification, or UE-specific radio resource control (RRC) signaling a common scrambling sequence or a common frozen bit pattern, respectively.

In an embodiment, the receiver (e.g., UE 208 or 210) should be able to know which part of the DCI are transmitted in which PDCCH. For example, in one embodiment for one PDSCH/PUSCH the entire DCI is contained in one PDCCH whereas for another PDSCH/PUSCH only differential information is transmitted in an associated PDCCH and the remaining DCI is known to the receiver from a different PDCCH.

Alternatively, PDCCH for two PDSCH/PUSCH may be transmitted in three PDCCH transmissions whereby a first PDCCH transmission contains those DCI common to both PDSCH/PUSCH transmissions and a second and third PDCCH contains the information specific to a first and second PDSCH/PUSCH transmission. In that case, to decode the first and second PDSCH/PUSCH transmission the receiver combines the first PDCCH transmission with the second and third one, respectively. In either case, the receiver has to know the partitioning of DCI into one or more PDCCH transmissions. In one embodiment, the receiver is informed by RRC signaling about said partitioning. In another embodiment, the partitioning is dynamically indicated in the first DCI, e.g., by one of the fields 301, 302, 303, 304, or 305. In yet another embodiment, the partitioning can be static, e.g., by specification or system information broadcast.

In addition to overhead reductions, the embodiments disclosed herein can also be used to reduce the number of blind decodes at the UE receiver and thus the UE's power consumption thereby prolonging UE battery life. In one embodiment, a mapping can be specified between the first DCI 301, 302, 303, 304, and 305 and the second DCI 306, 307, 308, and 309 (or, alternatively, between 301, 302, 303, 304, 305, 306, 307, 308, 309 and 316, 317, 318, 319). Hence, after reception of the first DCI the UE knows in which time/frequency resources to receive the second DCI and hence, the second DCI need not be decoded via blind detection. More specifically, from the first PDCCH transmission the receiver can infer the time/frequency resources in which the second DCI is transmitted, or, alternatively, it can infer a reduced search space to monitor for the second DCI transmission. Said mapping can be dynamically indicated in the first DCI, semi-statically configured at the UE via system information broadcast or UE-specific RRC signaling, or fixed in the specifications.

Figure 4:
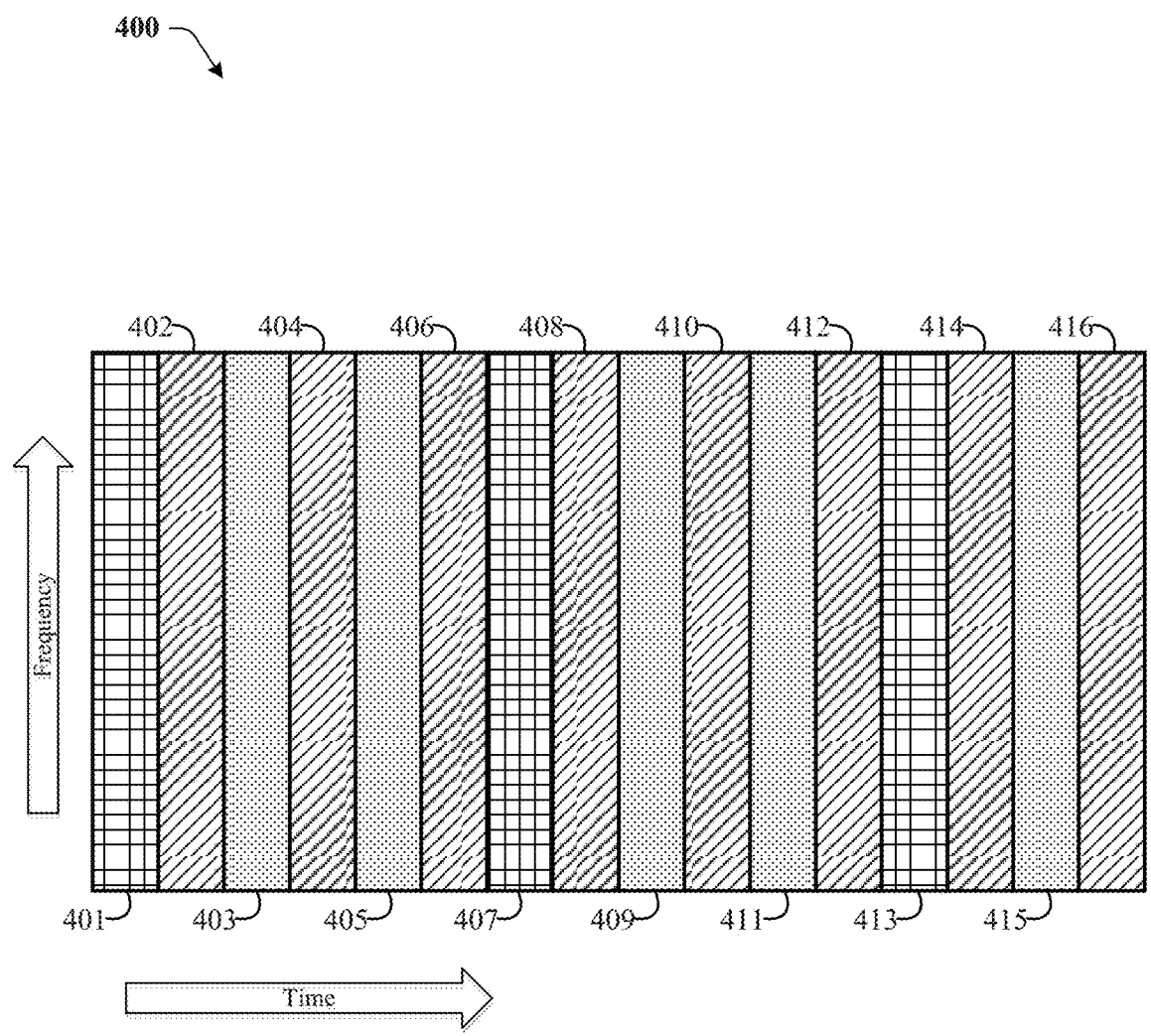
FIG. 4 illustrates an example block diagram showing downlink control segmentation across a time domain in accordance with various aspects and embodiments of the subject disclosure.

Turning now to FIG. 4, illustrated is an example block diagram 400 showing downlink control segmentation across a time domain in accordance with various aspects and embodiments of the subject disclosure.

In an embodiment, the common DCI can be sent not from different base station but in different time instances or in different transmit time intervals. As an example, a UE may be configured to monitor for some DCI in OFDM symbols 401, 407 and 413 whereas it monitors for other DCI in OFDM symbols 402, 404, 406, 408, 410, 412 and 416. DCI transmitted in symbol 401 may contain all the information to receive/transmit a PUSCH/PDSCH in which case DCI transmitted in symbols 402, 404, 406 only contains incremental DCI to receive/transmit a different PUSCH/PDSCH according to the embodiments herein. Alternatively, DCI transmitted in symbol 401 may only contain the common information of multiple PDSCH/PUSCH and DCI transmitted in symbols 402, 404, 406 contains the DCI not common to multiple PUSCH/PDSCH according to the embodiments herein. The same principles describing the segmentation (including CRC bits) as discussed with regard to FIG. 3 is also relevant and applicable to FIG. 4.

In yet another embodiment, the common DCI transmitted in symbols 401, 407 and 413 can be identical, i.e., it can be repeated for increased robustness. This is important as the UE may not be able to transmit/receive a PUSCH/PDSCH with just the DCI contained in symbols 402, 404, 406, 408, 410, 412 and 416.

Figure 5:
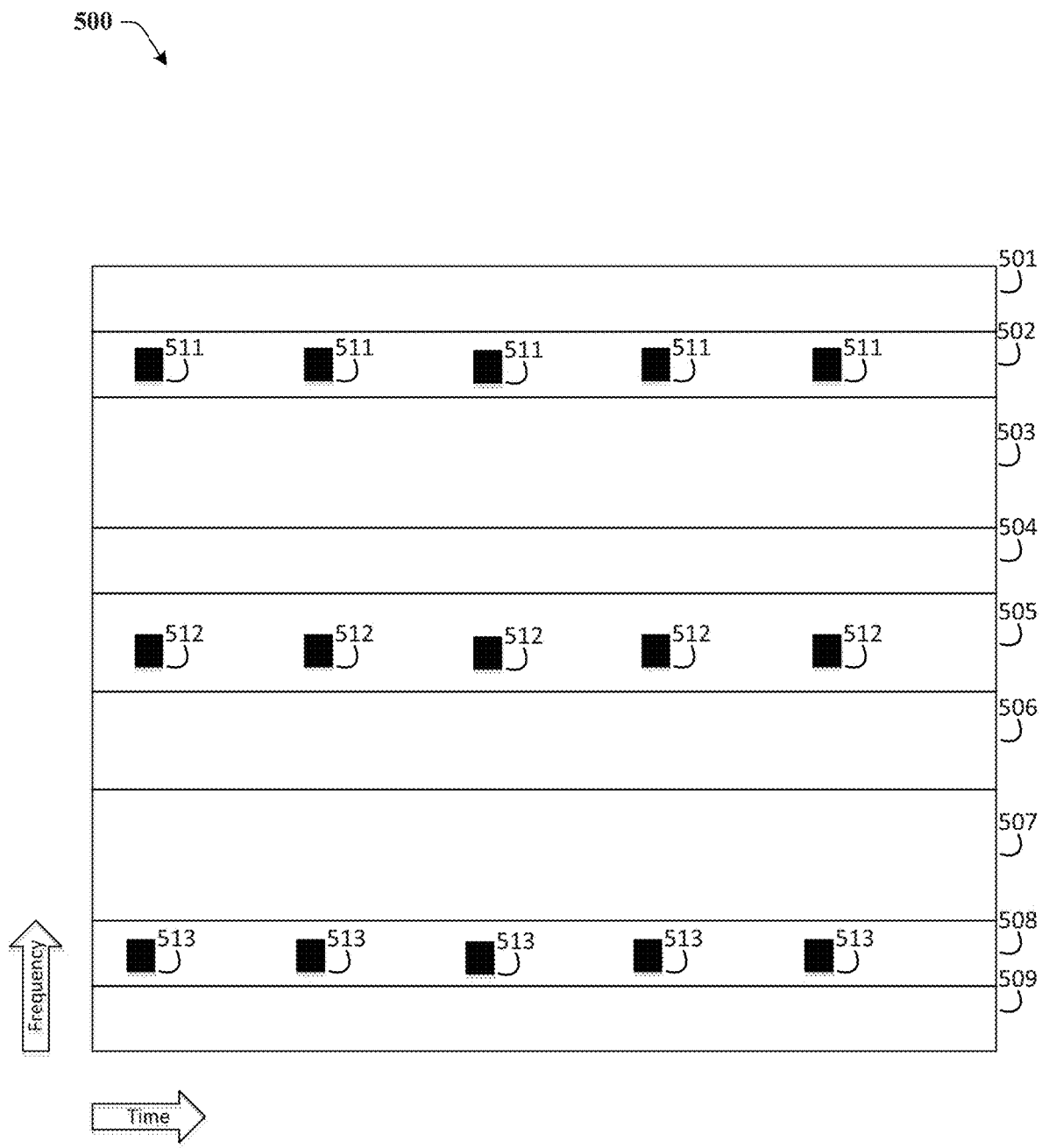
FIG. 5 illustrates an example block diagram showing downlink control segmentation across a frequency domain in accordance with various aspects and embodiments of the subject disclosure.

Turning now to FIG. 5, illustrated is an example block diagram 500 showing downlink control segmentation across a frequency domain in accordance with various aspects and embodiments of the subject disclosure.

In an embodiment, a wide bandwidth may be partitioned into multiple subbands 501, 502, 503, 504, 505, 506, 507, 508 and 509. Some subbands may contain synchronization and other broadcast signals and channels 511, 512, and 513 as depicted for subbands 502, 505 and 508 respectively. Other subbands may not contain common channels and signals. In this embodiment, the common DCI 301, 302, 303, 304 and 305 is only transmitted in some subbands whereas the remaining DCI (306, 307, 308, and 309 for one PDSCH/PUSCH and 316, 317, 318, and 319 for another PDSCH/PUSCH, respectively) is only transmitted on the subband on which the respective PUSCH/PDSCH is transmitted. The same principles describing the segmentation (including CRC bits) as discussed with regard to FIG. 3 is also relevant and applicable to FIG. 5.

Figure 6:
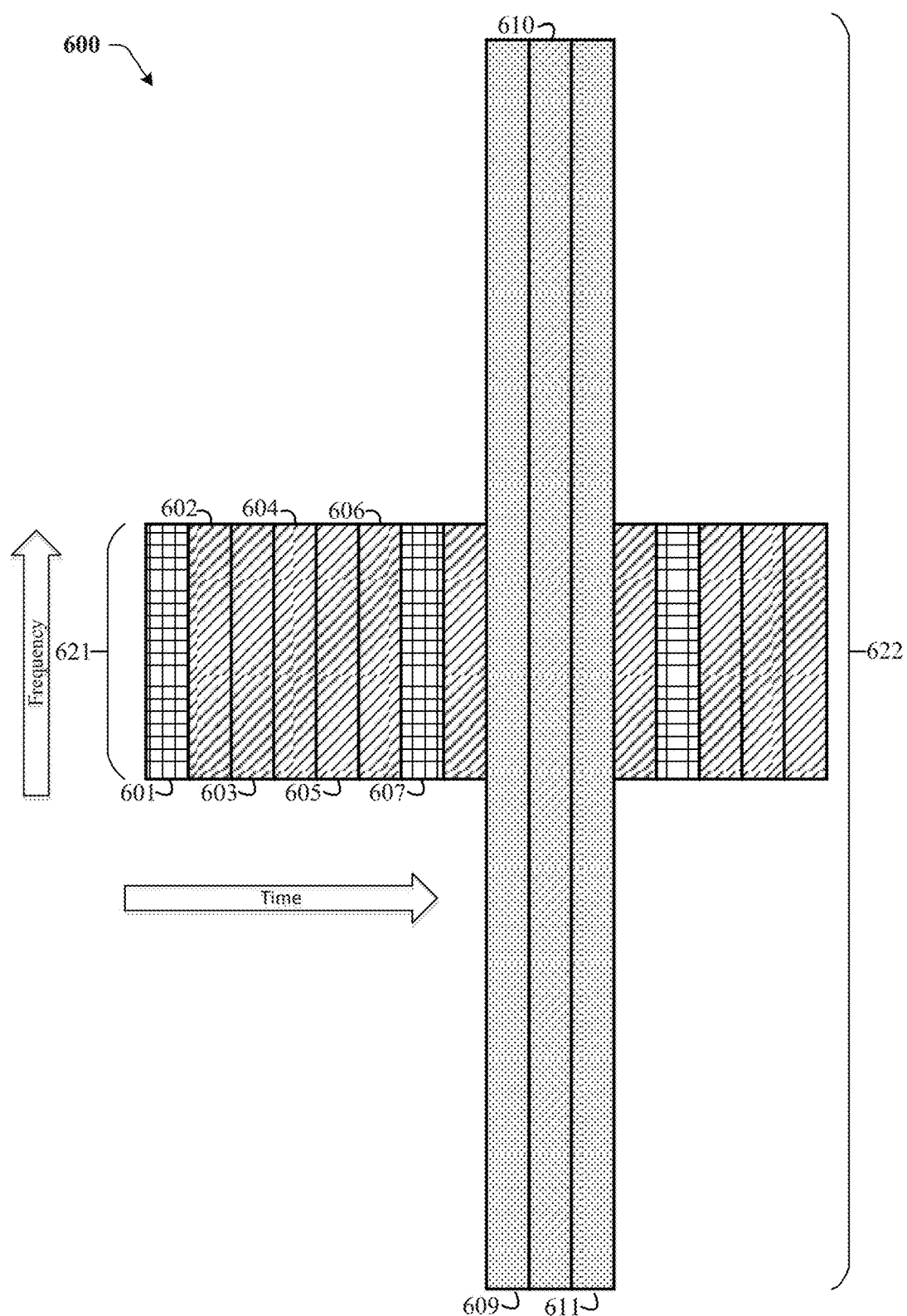
FIG. 6 illustrates an example block diagram showing another embodiment of downlink control segmentation in accordance with various aspects and embodiments of the subject disclosure.

Turning now to FIG. 6, illustrated is an example block diagram 600 showing another embodiment of downlink control segmentation in accordance with various aspects and embodiments of the subject disclosure.

In an embodiment, the wide bandwidth may be treated as a single carrier. In order to reduce the UE power consumption for prolonged battery life, the UE is configured to only monitor a narrow bandwidth 621 for possible PDCCH transmissions. These PDCCH transmissions can schedule PDSCH/PUSCH transmissions in the narrow bandwidth 621. For very large data packets, the gNB scheduler may want to sacrifice UE power consumption by scheduling a PDSCH/PUSCH transmission on a wider bandwidth 622. Scheduling PDSCH/PUSCH transmissions in said larger bandwidth 622 requires additional and/or larger DCI fields since more physical resources are addressable. For example, DCI fields 301, 302, 303, 304 and 305 may contain all the necessary information to schedule a PDSCH/PUSCH transmission in the narrow bandwidth 621. However, in order to schedule a PDSCH/PUSCH transmission in the wider bandwidth 622 additional fields 306, 307, 308, and 309 are needed. In this example, DCI fields 301, 302, 303, 304 and 305 are transmitted in symbols 601, 607, and 613. If, however, as depicted in FIG. 6 on symbol 607 a PDCCH schedules a wideband transmission in bandwidth 622, additional DCI (fields 306, 307, 308, and 309) are transmitted as part of the wideband transmission in symbols 609, 610 and 611 according to the embodiments herein. The same principles describing the segmentation (including CRC bits) as discussed with regard to FIG. 3 is also relevant and applicable to FIG. 6.

Figure 7:
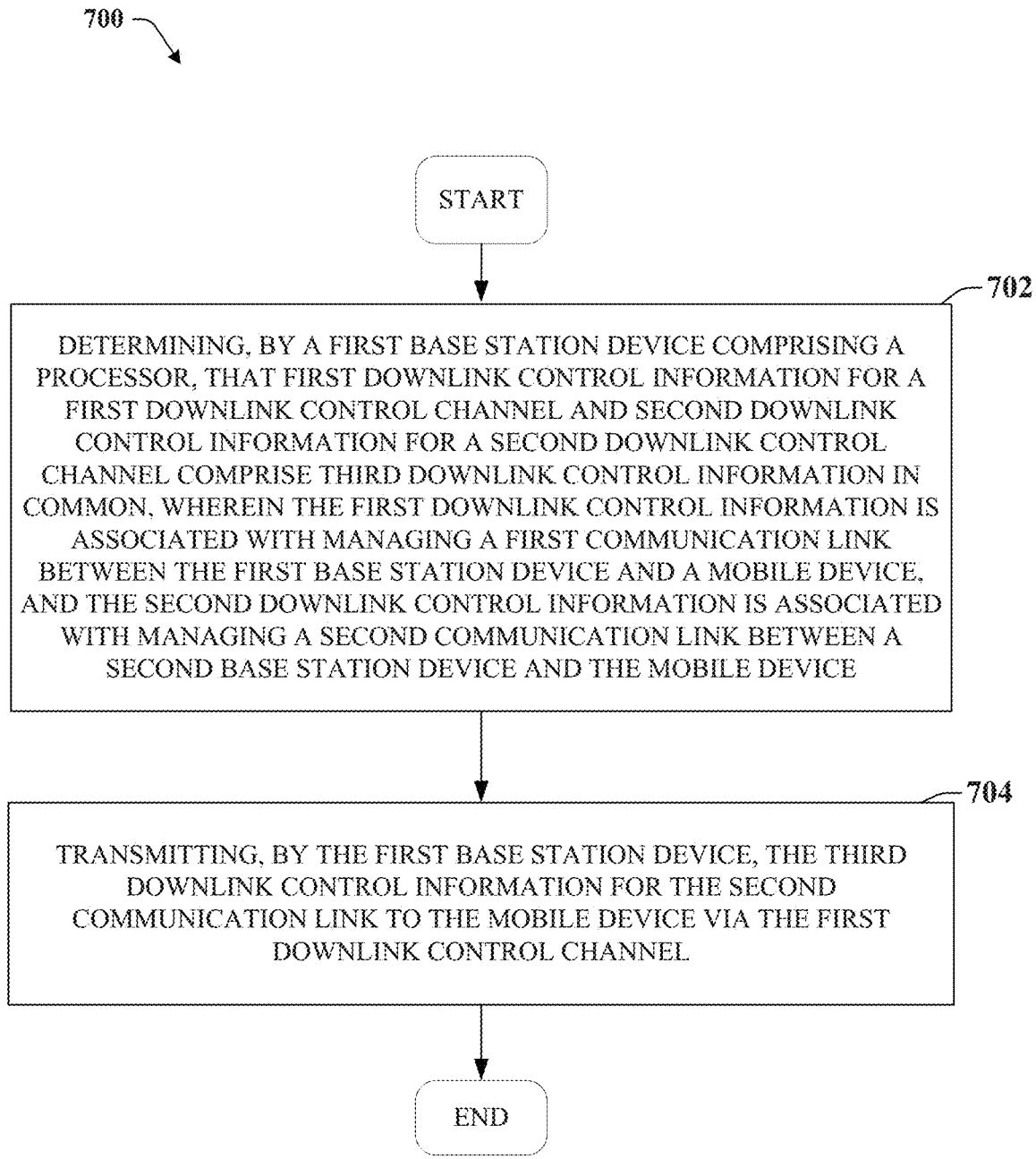
FIG. 7 illustrates an example method for configuring downlink control segmentation in accordance with various aspects and embodiments of the subject disclosure.
Figure 8:
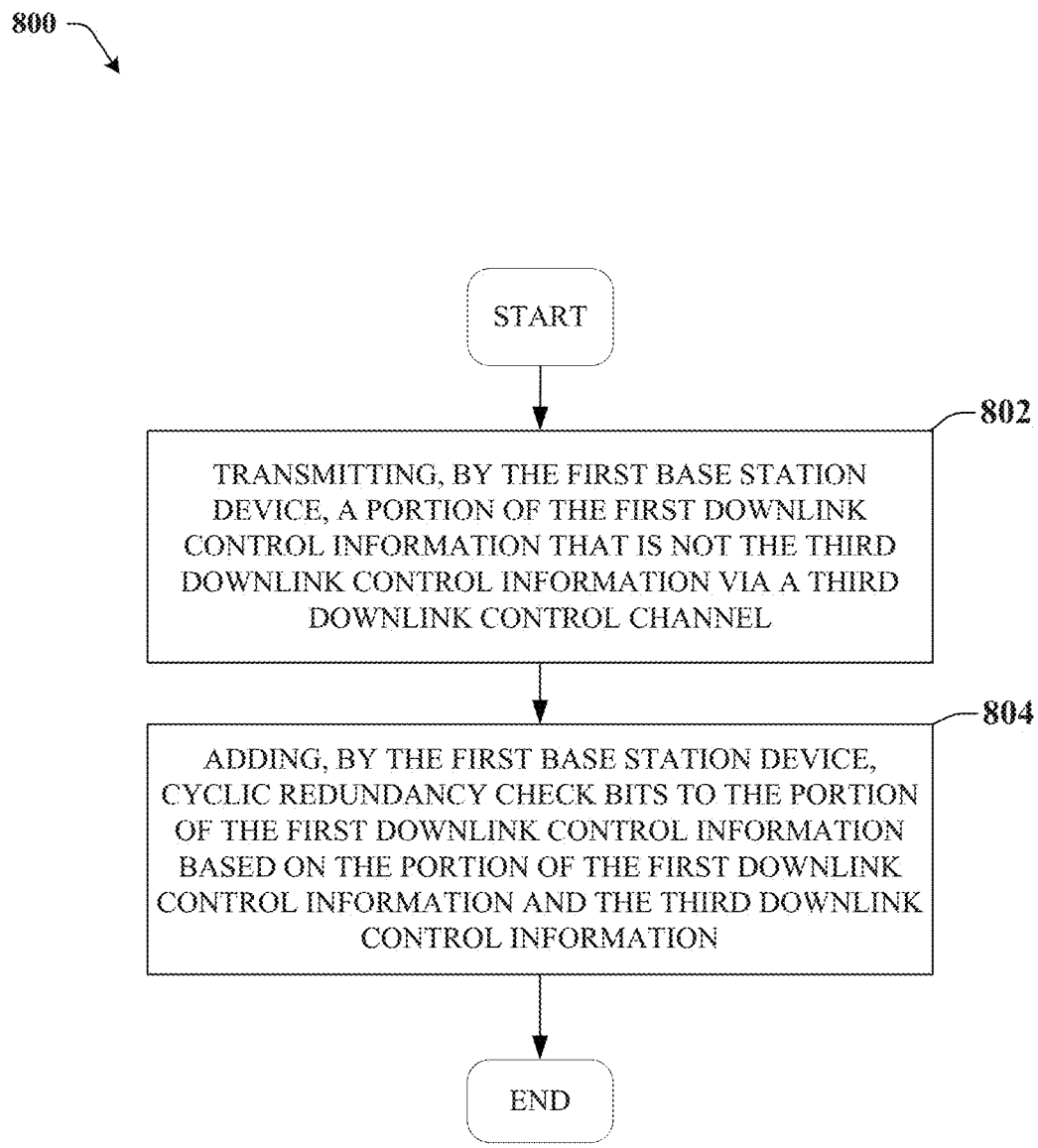
FIG. 8 illustrates an example method for configuring downlink control segmentation in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 depicts an example method for configuring downlink control segmentation in accordance with various aspects and embodiments of the subject disclosure.

Method 700 can start at 702 where the method includes determining, by a first base station device comprising a processor, that first downlink control information for a first downlink control channel and second downlink control information for a second downlink control channel comprise third downlink control information in common, wherein the first downlink control information is associated with managing a first communication link between the first base station device and a mobile device, and the second downlink control information is associated with managing a second communication link between a second base station device and the mobile device.

At 704, the method can include transmitting, by the first base station device, the third downlink control information for the second communication link to the mobile device via the first downlink control channel.

FIG. 8 illustrates an example method 800 for configuring downlink control segmentation in accordance with various aspects and embodiments of the subject disclosure.

Method 800 can begin at 802 wherein the method includes transmitting, by the first base station device, a portion of the first downlink control information that is not the third downlink control information via a third downlink control channel.

At 804, the method can include adding, by the first base station device, cyclic redundancy check bits to the portion of the first downlink control information that is not the third downlink control information based on the portion of the first downlink control information that is not the third downlink control information and the third downlink control information.

Figure 9:
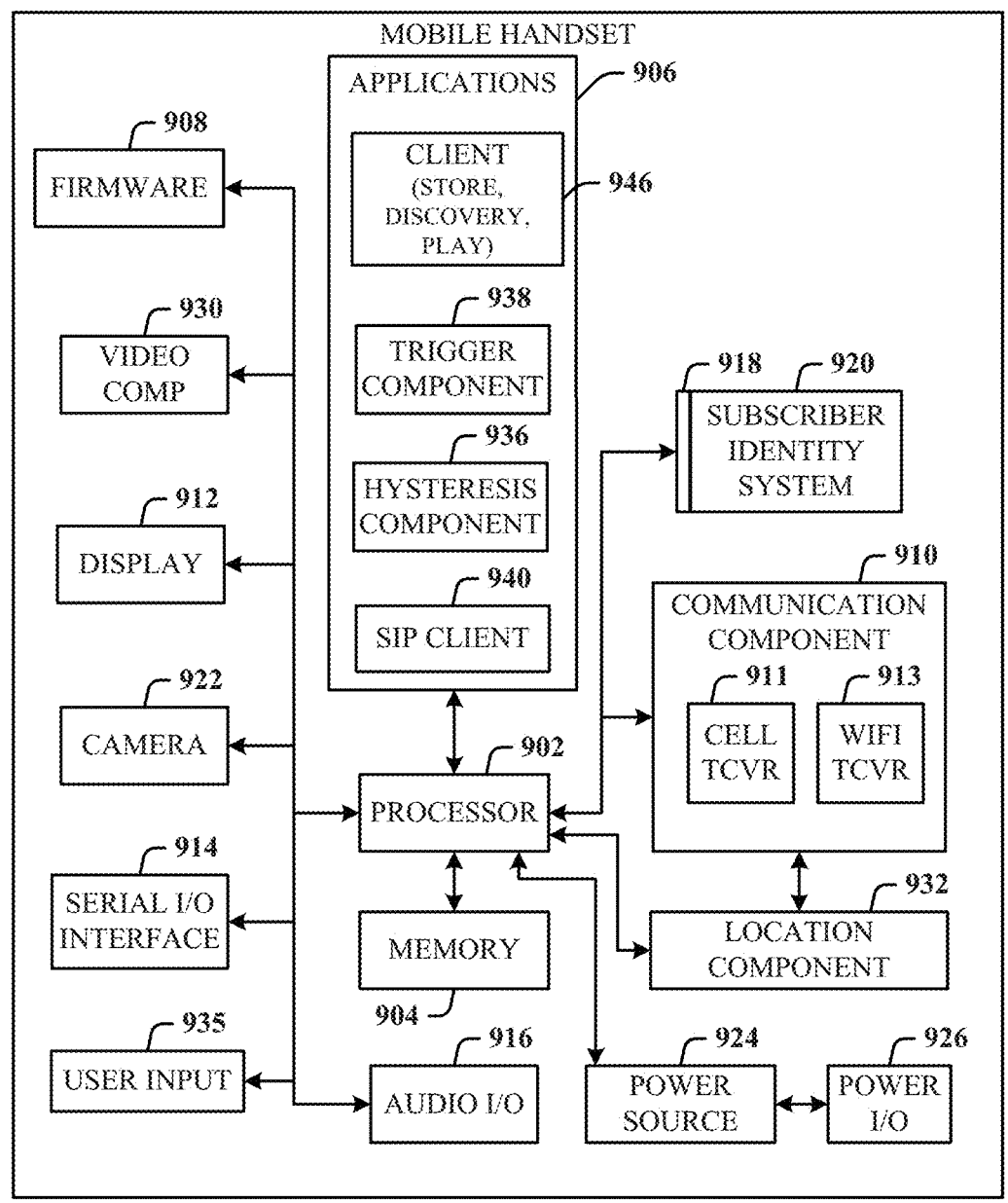
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
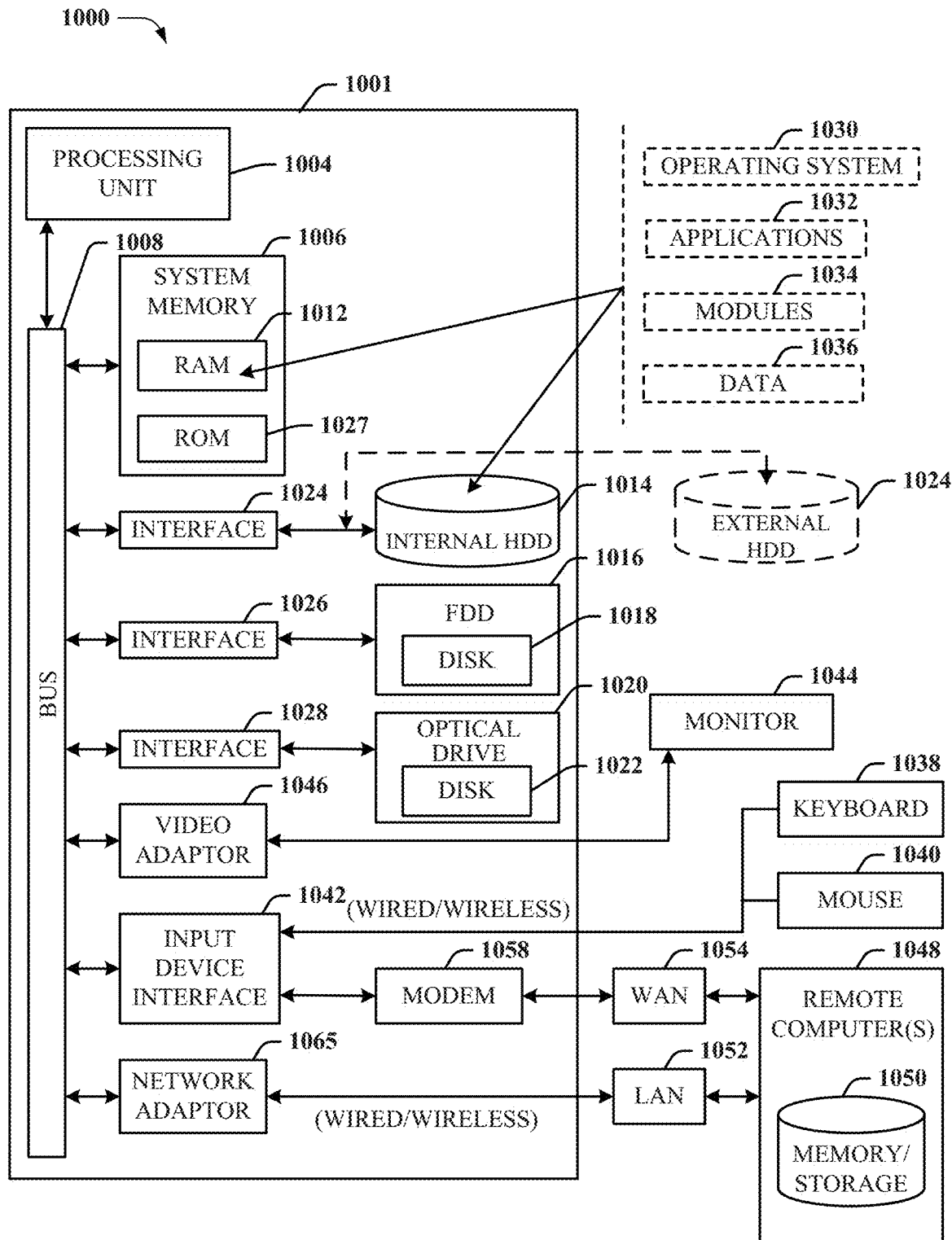
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A first base station device, comprising:
   a processor; and
   a memory that stores executable instructions that, when executed by the processor, facilitate performance of operations, comprising:
      in response to determining that first downlink control information used to configure a first data channel between the first base station device and a mobile device and second downlink control information used to configure a second data channel between a second base station device and the mobile device comprise redundant downlink control information, and that the redundant downlink control information has been transmitted by the second base station to the mobile device via a second downlink control channel:
         transmitting non-redundant portions of the first downlink control information to the mobile device via a first downlink control channel between the first base station device and the mobile device.

2. The first base station device of claim 1, wherein the operations further comprise:
   adding cyclic redundancy check bits to the non-redundant portions based on the first downlink control information.

3. The first base station device of claim 1, wherein the mobile device is a first mobile device, and wherein the operations further comprise:
   in response to determining that third downlink control information used to configure a third data channel between the first base station device and a second mobile device and fourth downlink control information used to configure a fourth data channel between the first base station device and a third mobile device comprise second redundant downlink control information:
      transmitting the third downlink control information to the second mobile device via a third downlink control channel between the first base station device and the second mobile device.

4. The first base station device of claim 3, wherein the operations further comprise:
   transmitting second non-redundant portions of the fourth downlink control information to the third mobile device via a fourth downlink control channel between the first base station device and the third mobile device.

5. The first base station device of claim 1, wherein the redundant downlink control information comprises a common modulation and coding scheme (MCS).

6. The first base station device of claim 1, wherein the first downlink control channel is associated with a first frequency domain, and the second downlink control channel is associated with a second frequency domain different from the first frequency domain.

7. The first base station device of claim 1, wherein the first downlink control channel is associated with a first time interval, and the second downlink control channel is associated with a second time interval different from the first time interval.

8. A method, comprising:
   in response to determining, by a first base station device comprising a processor, that first downlink control information used to configure a first data channel between the first base station device and a mobile device and second downlink control information used to configure a second data channel between a second base station device and the mobile device comprise redundant downlink control information, and that the redundant downlink control information has been transmitted by the second base station device to the mobile device via a second downlink control channel:
      transmitting, by the first base station device, non-redundant portions of the first downlink control information to the mobile device via a first downlink control channel between the first base station device and the mobile device.

9. The method of claim 8, further comprising:
   adding, by the first base station device, cyclic redundancy check bits to the non-redundant portions based on the first downlink control information.

10. The method of claim 8, wherein the mobile device is a first mobile device, and further comprising:
    in response to determining that third downlink control information used to configure a third data channel between the first base station device and a second mobile device and fourth downlink control information used to configure a fourth data channel between the first base station device and a third mobile device comprise second redundant downlink control information:
       transmitting, by the first base station device, the third downlink control information to the second mobile device via a third downlink control channel between the first base station device and the second mobile device.

11. The method of claim 10, further comprising:
    transmitting, by the first base station device, second non-redundant portions of the fourth downlink control information to the third mobile device via a fourth downlink control channel between the first base station device and the third mobile device.

12. The method of claim 8, wherein the redundant downlink control information comprises a common modulation and coding scheme (MCS).

13. The method of claim 8, wherein the first downlink control channel is associated with a first frequency domain, and the second downlink control channel is associated with a second frequency domain different from the first frequency domain.

14. The method of claim 8, wherein the first downlink control channel is associated with a first time interval, and the second downlink control channel is associated with a second time interval different from the first time interval.

15. A non-transitory machine-readable medium, comprising executable instructions that, when executed by a processor of a first base station device, facilitate performance of operations, comprising:

in response to determining that first downlink control data used to configure a first data channel between the first base station device and a mobile device and second downlink control data used to configure a second data channel between a second base station device and the mobile device comprise redundant downlink control data, and that the redundant downlink control information has been transmitted by the second base station to the mobile device via a second downlink control channel:

transmitting non-redundant portions of the first downlink control data to the mobile device via a first downlink control channel between the first base station device and the mobile device.

16. The non-transitory machine-readable medium of claim 15, wherein the operations further comprise:

adding cyclic redundancy check bits to the non-redundant portions based on the first downlink control data.

17. The non-transitory machine-readable medium of claim 15, wherein the mobile device is a first mobile device, and wherein the operations further comprise:

in response to determining that third downlink control data used to configure a third data channel between the first base station device and a second mobile device and fourth downlink control data used to configure a fourth data channel between the first base station device and a third mobile device comprise second redundant downlink control data:

transmitting the third downlink control data to the second mobile device via a third downlink control channel between the first base station device and the second mobile device.

18. The non-transitory machine-readable medium of claim 17, wherein the operations further comprise:

transmitting second non-redundant portions of the fourth downlink control data to the third mobile device via a fourth downlink control channel between the first base station device and the third mobile device.

19. The non-transitory machine-readable medium of claim 15, wherein the redundant downlink control data comprises a common modulation and coding scheme (MCS).

20. The non-transitory machine-readable medium of claim 15, wherein the first downlink control channel is associated with a first frequency domain, and the second downlink control channel is associated with a second frequency domain different from the first frequency domain.

\* \* \* \* \*